April 13, 1943.                    W. H. FARR                    2,316,410
                                 WATT HOUR METER
                              Filed Sept. 4, 1940               2 Sheets-Sheet 2
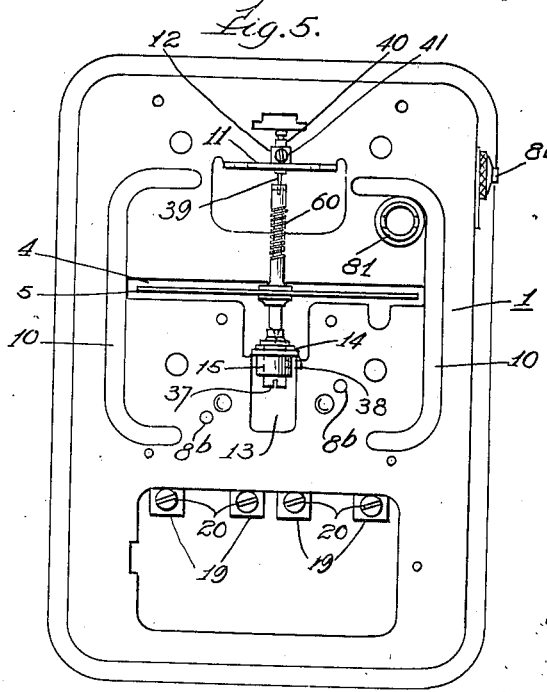
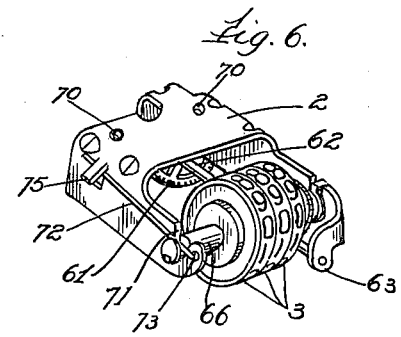
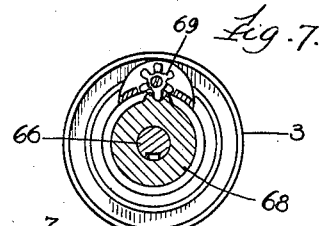
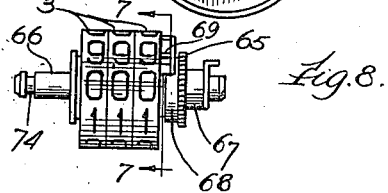
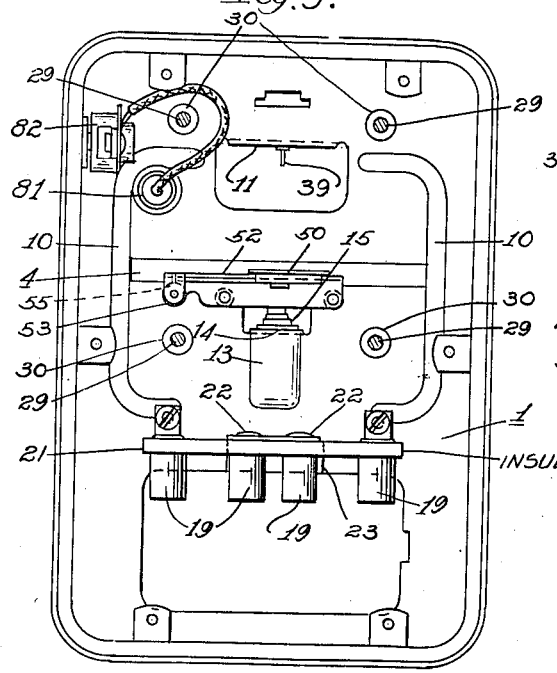
Inventor
Willard H. Farr
by his Attorneys Patented Apr. 13, 1943

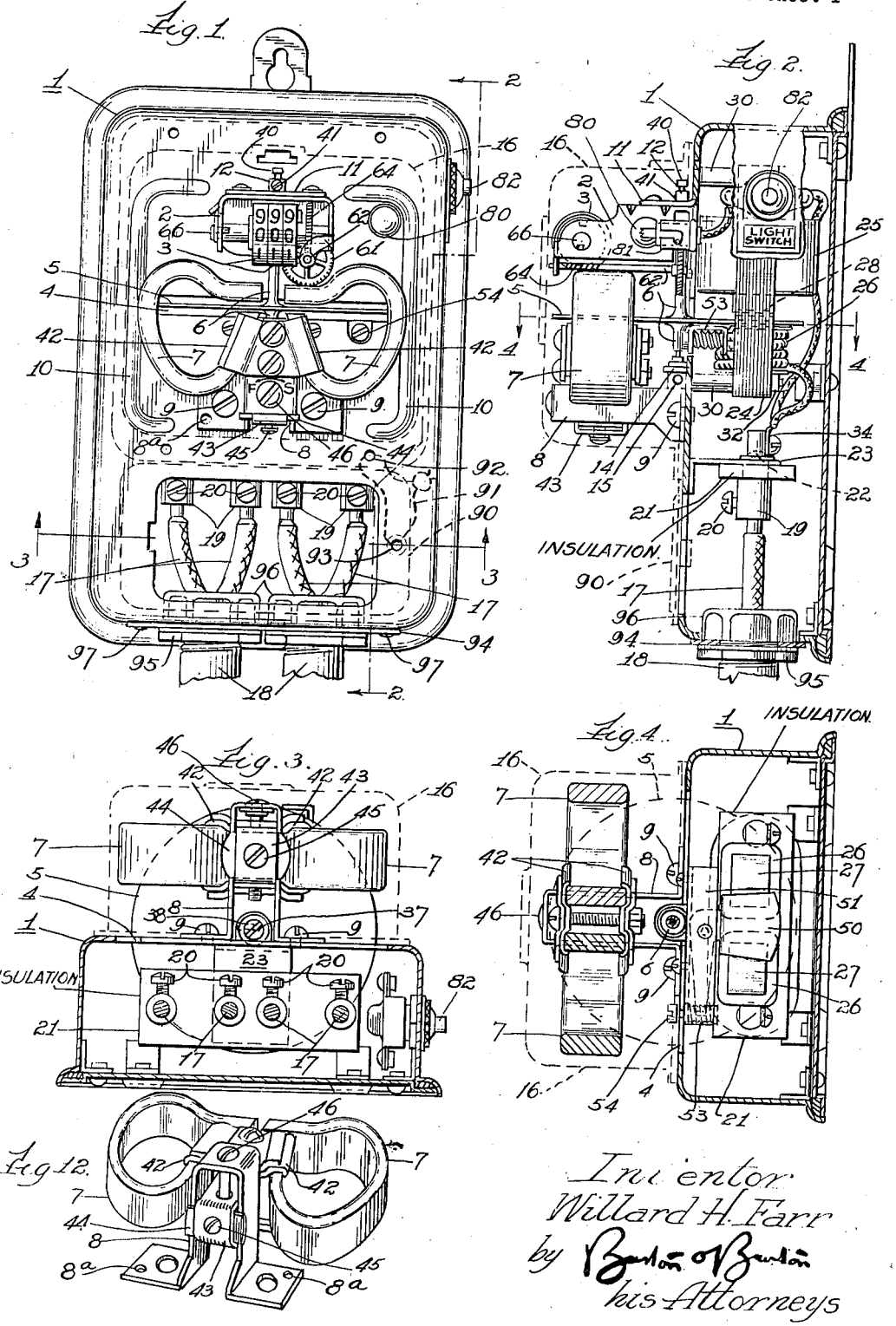

2,316,410

UNITED STATES PATENT OFFICE 2,316,410

WATT-HOUR METER

Willard H. Farr, Chicago, Ill., assignor to Stewart-Warner Corporation, Chicago, Ill., a corporation of Virginia Application September 4, 1940, Serial No. 355,394

3 Claims. (Cl. 171—264)

This invention relates to a watt hour meter especially designed for use with urban and rural domestic installations. One object of the invention is to provide a meter which can be easily and accurately read at all times, wherever it may be installed. Another object is to provide a construction composed of distinct units arranged for facility and speed of assembly and each readily removable independently of the other for repair or replacement. A further object is to provide a construction in which the casing which houses the field core and its windings, together with circuit connections for the meter, includes a front wall on which several units of the mechanism are mounted, such as the spindle bearings for the armature disk, the supporting bracket for the damping magnets and the register mechanism driven by the armature, together with a secondary cover enclosing said units.

It is also an object of the invention to provide a meter with a built-in electric light which may be switched on at will for illuminating the dials or testing the circuit.

Other objects and advantages will appear as the description proceeds.

In the drawings:

Figure 1 is a front elevation of a watt hour meter embodying this invention, with the dial-enclosing cover removed to show a portion of the mechanism, and with the cover plate removed to give access to the terminals.

Figure 2 is a vertical section taken substantially as indicated at line 2—2 on Figure 1.

Figure 3 is a horizontal section taken as indicated at line 3—3 on Figure 1.

Figure 4 is a horizontal section taken as indicated at line 4—4 on Figure 2.

Figure 5 is a front elevation of the main casing with the register mechanism and magnetic brake removed.

Figure 6 is a perspective view of the register mechanism unit.

Figure 7 is an end elevation of the register dials taken as a section at line 7—7 on Figure 8.

Figure 8 is a front elevation of the register dials removed from their mounting frame.

Figure 9 is a rear elevation looking into the main casing with most of the operating parts of the meter removed therefrom.

Figure 10 is a perspective view of the meter coils and their core arranged as a unit of the assembly.

Figure 11 is a perspective view of a calibrating shunt plate.

Figure 12 is a perspective view of the magnetic brake or damping unit.

The meter which is the subject of this invention operates in accordance with well understood principles for registering the consumption of current in the circuit in which it is connected, but it has been especially designed for convenience of manufacture, assembly and use. The main casing 1 is of generally rectangular form and encloses the potential coil and current coils, together with connectors or terminals by which the circuit lead wires may be attached for including the meter in the circuit. On the front wall of the casing 1 is mounted the frame 2 which supports the dials 3 of the register mechanism. A horizontal slot 4 in the front wall accommodates the rotor disk 5 whose spindle 6 is journaled just in front of the front wall; and the usual magnetic brake, comprising a pair of permanent magnets 7, 7, is also arranged as a special assembly unit supported by a bracket 8 which is secured to the front wall of the case by screws 9, 9, as seen in Figures 1 and 2. The front wall is stiffened by upraised beads 10, 10 and by a forwardly projecting flange 11 which carries the upper bearing 12 for the spindle 6, and also by a centrally disposed depression 13 from which a flange 14 projects forwardly to support the lower bearing 15 for the spindle 6, as seen in Figure 5. The mechanism which projects from the forward face of the casing 1 is protectively enclosed in a box-like cover 16, shown in dotted outline in Figures 1 and 2, and it may be understood that the front wall of this cover 16 includes a transparent window (not shown) through which the register dials 3 may be read, and, if desired, an additional window through which the movement of the disk 5 may be observed.

The lead wires 17 enter the casing 1 through a pair of tubular conduits 18 and are secured in terminal sleeves 19 by means of binding screws 20 with which said sleeves are provided. These sleeves are fixedly mounted in a block or bar 21 of insulating material, such as fibre, and, as seen in Figure 9, the two middle sleeves of the group include terminal rivets 22 by which the bar 21 is attached to a metallic bracket 23 welded to the inner face of the front wall of the case 1 and projecting rearwardly to support the bar 21; this arrangement serves to ground the two middle terminals to the casing. The terminals 20 and their supporting bar 21 thus constitute one unit of the assembly.

Another assembly unit consists of the laminated core 24 on which is wound the potential coil 25 and a pair of current coils 26. The pole pieces 27 for the current coils 26 are disposed side by side, while the pole piece 28 for the potential coil 25 is placed opposite them, forming a gap into which the rotor disk 5 projects so as to be driven by the resulting magnetic impulses at a speed proportional to the current consumption in the circuit in accordance with well understood principles. The coil assembly is secured in the casing 1 by studs 29 projecting rigidly from the inner face of the front wall and fitted with spacer sleeves 30, the studs extending through holes 31 in the laminated core 24 which is held in place thereon by nuts 32. At one corner of the core one terminal 33 of the potential coil 25 is grounded by attachment to one of the studs 29, as indicated in Figure 10. The other terminal 34 of the potential coil is secured to the upper end of one of the connector sleeves 19 to which the terminal 35 of one of the current coils is also connected. The other terminal 36 for the current coils is attached to the sleeve 19 at the other end of the bar 21, as will be readily understood from the relative positions of the terminals, as seen in Figure 10.

The step bearing for the lower end of the spindle 6 is supported in a cylindrical body 15 which is upset or "staked" into permanent engagement with the bracket flange 14 projecting from the front wall of the casing 1. The bearing jewel (not shown) is carried in a screw 37 vertically adjustable in the body 15 and accessible from below, and a set screw 38 is provided to secure the bearing in adjusted position. At the upper end of the spindle 6 the bearing is in the form of a slender, needle-like journal 39 extending from a cylindrical body 40 which is slidably adjustable in the member 12, rigidly mounted in the bracket flange 11 of the case. A set screw 41 fixes the part 40 at vertically adjusted position and is readily accessible from the front for loosening the member 40 if it should be necessary to remove it for repair or replacement. Thus, in assembling the meter, the disk 5, with its spindle 6, may be set in its bearings at 12 and 15, as shown in Figure 5, independently of the several other assembly units.

Calibration of the meter for full load conditions up to 100 percent is effected by adjustment of the damping magnets 7. The magnets are clamped between the wing portions 42 of a U-shaped yoke 43 which extends between the legs of the bracket 8 so that a short cross-bar 44, disposed under the middle portion of the yoke 43, cooperates with the edges of the wings 42 in gripping the bracket 8. The gripping pressure is produced by a screw 45 threaded into the yoke 43 and impinging upon the cross-bar 44, causing the latter to grip the edges of the bracket 8 with a frictional hold. However, upon slightly loosening this screw 45 the adjusting screw 46, which is captively journaled in the end of the bracket 8 and has threaded engagement with one leg of the yoke 43, may be actuated to shift the magnets backward or forward along the bracket 8 so that their air gaps will register with portions of the disk 5, either nearer or farther from the center of the disk, thus securing the desired braking or damping effect. As indicated in Figure 12, the magnets 7, with their supporting bracket and the adjusting means just described, constitute an assembly unit which may be put together before being mounted on the front wall of the casing 1, and which may be removed bodily therefrom by any service man, merely by taking out the screws 9. The calibration need not be disturbed and the unit can be accurately replaced because the bracket foot flanges are formed with positioning dowels 8$^a$ which fit holes 8$^b$ in the casing.

For light load calibration of about 10 percent there is provided a shunt plate 50 which extends across and in contact with the poles 27 of the current coils, as seen in Figure 4. The shunt plate is pivoted on an angle bracket 51 so that an operating arm 52, integral with the plate, extends over a worm or screw 53 having a slotted head 54 projecting through the front wall of the casing 1 so as to be readily accessible for making the calibrating adjustment. The end of the arm 52 is formed with teeth 55 which engage with the worm 53 so that rotation of the latter swings the shunt plate 50 about its fulcrum pivot and alters the amount by which it overlaps one or the other of the poles 27. Preferably, the arm 52 is slightly sprung and is assembled under sufficient tension to hold its teeth firmly in mesh with the worm 53 and take up all play.

The rotation of the spindle 6 turns the worm 60 thereon in mesh with a gear 61 on a shaft 62 which extends forwardly to a journal bearing in a lug 63 which is a part of the frame or bracket 2 by which the counter train or register is supported. The shaft 62 has a worm 64 which meshes with a gear 65 carried loosely on a stationary shaft 66. The gear 65 is fixed on the hub 67 of a gear 68 having two teeth which mesh intermittently with the teeth of a pinion 69 for driving the adjacent dial wheel 3 of the register in accordance with the well understood Geneva stop movement. The gear 65 and the gear 68, associated rigidly with it, may be termed the "dummy dial," since these gears correspond substantially to the pair of gears contained within each of the regular dials 3, but in the case of these gears 65 and 68 the dial itself is omitted.

A feature of this arrangement is that although the gear 65 rotates continuously when driven by the rotation of the disk 5 through the gear train just described, the first numeral bearing dial 3 is stationary at all times, except the moment when the two teeth of the gear 68 are turning the pinion 69 through a sufficient angle to shift the dial by the distance between consecutive numerals. This is a distinct improvement over previous meters in which the continuous drive was connected directly to the first dial of the train, shifting it gradually and therefore displaying its numerals most of the time in positions out of registration with the other numerals of the register and often only partially visible at the reading window. As a result, it was frequently difficult to determine the last numeral of the reading and to avoid making mistakes on this account. With the present construction all the numerals are normally registered in alignment showing the complete reading at a glance; and the last numeral is only out of registration for a very brief period. The chance is very slight that the meter will stop in this particular position with one dial numeral out of alignment with the others.

For purposes of repair the entire register unit may be removed by merely releasing the screws which engage the threaded holes 10 in the frame 2 for attaching it to the flange 11 of the front wall of the casing 1. Ordinarily, however, it is not even necessary to remove the frame or bracket 2, since the fixed shaft 66 has one end lodged in an upwardly open notch 71 in the frame 2 and retained therein by a spring wire 72. The angularly bent end of the wire engages a hole 73 in the bracket adjacent the notch 71, and the spring lies in a groove 74 formed in the shaft 66. The end of the spring wire is caught under a lug 75, as seen in Figure 6. It is only necessary to press down this end of the wire 72 and free it from the lug 75 so that it can be disengaged from the slot 74, allowing this end of the shaft 66 to be tilted out of the notch 71. The other end of the shaft may then be disengaged from its bearing in the frame 2, so that the dials 3 and their drive gear 65 can be removed as a unit on their shaft 66 for cleaning, lubricating or other attention which they may require.

The reading of the register dials is further facilitated by the provision of an electric lamp bulb 80 mounted in a socket 81 which is secured in the front wall of the casing 1 in position to be housed under the cover 16. A push-button switch 82 controls the circuit for this lamp, allowing it to be lighted momentarily whenever it is desired to read the meter; and if the inner wall of the cover 16 be finished in white or other light color, the cavity of the cover will be flooded with light so as to brightly illuminate the numeral dials 3. Preferably, these dials are white with black markings, to give the reading maximum legibility. The lamp 80 may also be employed as a circuit-testing device, since it is connected directly into the main line by a branch wire 34ª extending from the lead wire 34 (see Fig. 10) and attached thereto under the wrapping of the potential coil 25, and will indicate whether or not the current is reaching the point at which the meter is coupled into the circuit. The switch button 82 is normally spring-pressed to open position so that the lamp 80 is in service only temporarily, as required. This lamp and its functions are the subject-matter of a separate application filed April 5, 1940, by Clarence A. Winder.

The arrangement of the various parts of this meter as small unit assemblies is particularly convenient, both in the original construction and in the event of repair or replacement of any of the units. The casing 1, which serves to enclose the field core unit 24 and its windings, and also the terminal block 21 and its connections, supports most of the other units on the outer face of its front wall, and these units are then enclosed in the secondary housing or cover 16, which may be easily removed for inspection or repair of the register mechanism, the armature bearings or the damping magnet assembly. Calibrating adjustments by means of the screw 46 and the shunt adjusting screw 54 may be effected by merely removing this cover 16. On the other hand, when the cover 16 is in place and the cover plate indicated in dotted outline at 90 is in position enclosing the lead wire connections, it is a simple matter to seal the meter, as by means of a sealing wire 91 connecting the heads of screws at 92 and 93 by which the cover 16 and the plate 90 are secured. This prevents tampering with the meter.

This self-contained construction fully protects the terminal connections by enclosing them within the case 1. As indicated, the tubular conduits 18 for the inleading wires 17 pass through apertures in a plate 94 which is removably secured over an opening in the lower end wall of the casing to facilitate the initial insertion of the conduits 18 and their securement by nuts 95 outside the plate and terminal nuts 96 engaging its inner surface. When the plate is then mounted in position by means of its fastening screws 97 the bared ends of the wires 17 are readily slipped into the terminal tubes 19 and secured by the binding screws 20, after which the application of the front plate 90 completes a terminal housing or enclosure for the conduits, protecting them against accidental short-circuit or any other mishap, as well as preventing access to the bare terminals for fraudulent tapping of the current.

At the same time, the reading of the dials is rendered so simple, by virtue of the dummy dial which insures alignment of the numerals practically at all times, and through the provision of the lamp 80 by which the dials can be illuminated, even though the meter may be installed in a dark corner, that it becomes feasible to permit the householder or other customer to take his own meter readings and report them to the power-supplying organization by mail, with only occasional check-ups by employees of the power company.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim as my invention:

1. In a watt hour meter, a casing comprising a front wall with a rearwardly extending integral marginal flange defining a rearwardly open cavity deep enough to contain all apparatus attached to the rear face of said front wall, an angle bracket secured to the rear face of said front wall and projecting into said cavity, a terminal block of insulating material with terminal fittings of conducting material secured in spaced relation to each other in said block, said block being mounted as a unit by attachment to said bracket with portions of said fittings presented toward one end of the casing and arranged for connection with inleading conductor wires, said end of the casing having a substantial area of its marginal flange cut away, and a cover plate detachably secured over said area formed with openings dimensioned to receive metallic conduits for the inleading conductors with the threaded ends of such conduits secured to the plate by clamping nuts, said plate being removable bodily from the casing to facilitate such securement of the conduits.

2. In a watt hour meter, a casing including a front wall, a field core unit with windings assembled thereon, means extending rigidly from the rear face of said wall and supporting the field core unit, said core having a pair of pole pieces side by side with faces disposed in a common plane perpendicular to said front wall of the casing and a calibrating unit comprising a bracket attached to the rear face of the front wall, a shunt plate pivoted to said bracket and extending over the said faces of the pole pieces, and adjusting means carried by said bracket operable to swing said shunt plate about its pivot, said front wall having an opening through which said adjusting means is accessible for operation.

3. In a watt hour meter, a casing including a front wall, a field core unit with windings assembled thereon, means extending rigidly from the rear face of said wall and supporting the field core unit, said core having a pair of pole pieces side by side with faces disposed in a common plane perpendicular to said front wall of the casing and a calibrating unit comprising a bracket attached to the rear face of the front wall, a shunt plate pivoted to said bracket and extending over the said faces of the pole pieces, a lever arm extending from said plate and an adjusting screw journaled in said bracket and engaging said lever for swinging the shunt plate about its pivot, the front wall of the casing having an opening at which the adjusting screw is accessible.

WILLARD H. FARR.